United States Patent
McClure

(10) Patent No.: US 12,085,905 B2
(45) Date of Patent: Sep. 10, 2024

(54) INTEGRATED QUADRATIC CONTROL OF INDUSTRIAL PROCESSES

(71) Applicant: SPARTAN CONTROLS LTD., Calgary (CA)

(72) Inventor: Ken McClure, Calgary (CA)

(73) Assignee: SPARTAN CONTROLS LTD., Calgary (CA)

(*) Notice: Subject to any disclaimer, the term of this patent is extended or adjusted under 35 U.S.C. 154(b) by 0 days.

(21) Appl. No.: 17/497,607

(22) Filed: Oct. 8, 2021

(65) Prior Publication Data
US 2023/0110662 A1    Apr. 13, 2023

(51) Int. Cl.
*G05B 15/02*    (2006.01)

(52) U.S. Cl.
CPC .................................. *G05B 15/02* (2013.01)

(58) Field of Classification Search
CPC ....................................................... G05B 15/02
See application file for complete search history.

(56) References Cited

U.S. PATENT DOCUMENTS

| | | | | |
|---|---|---|---|---|
| 2005/0038532 A1* | 2/2005 | Cheng | ..................... | G05B 11/32 700/20 |
| 2019/0137976 A1* | 5/2019 | Tsutsumi | ............ | G05B 19/4103 |
| 2021/0231039 A1* | 7/2021 | Piche | ....................... | F01N 3/208 |

OTHER PUBLICATIONS

Papathanasiou et al. (Maria M. Papathanasiou et al., Advanced Control Strategies for the Multicolumn Countercurrent Solvent Gradient Purification Process, American Institute of Chemical Engineers AIChE Journal, Jul. 2016, vol. 62, No. 7, pp. 2341-2357) (Year: 2016).*

* cited by examiner

*Primary Examiner* — Michael W Choi
(74) *Attorney, Agent, or Firm* — Sheppard, Mullin, Richter & Hampton LLP

(57) ABSTRACT

A method and system for operating an industrial process using an integrated quadratic controller (IQC) is provided for a single input multiple output system (SIMO). A target process value (PV) associated with an output of the industrial process is used to define an optimal output of the industrial process. Manipulated-variables (MVs) associated with a plurality of loads within the industrial process are utilized for controlling a rate of operation associated with the load impacting the PV of the industrial process. Quadratic programming (QP) is defined to optimize proportional action gains for the determined MVs given an update control variable PV. QP gain-modified proportional action are integrated into a control system of the industrial process and a modified control system to update MV output state map defining the multiple output to control respective loads in the industrial control process for achieving the target PV is generated.

19 Claims, 4 Drawing Sheets

INTEGRATED QUADRATIC CONTROL OF INDUSTRIAL PROCESSES

TECHNICAL FIELD

The present disclosure relates to industrial process control systems and in particular to control optimization of multivariable industrial process control systems.

BACKGROUND

Industrial processes such as manufacturing plants, chemical plants, refineries or ore processing plants utilize multiple control systems throughout the stages of the processes. The process control systems manage the use of loads within the process. The load may be for example motors, generators, valves, pumps, actuators, conveyors, or industrial equipment in the production process with each component potentially having operational constraints which impact the overall production output. Optimizing the output of the industrial process, defined as the profit of the system, can be complex due to the multiple operational constraints of each of the loads within the system comprising the industrial process. The interaction of the loads within the process impact the output/profit of the entire process. Achieve optimal operation of each load to achieve the optimal output present significant challenges.

Various types of industrial controllers such as Model Predictive Control (MPC) or Proportional-Integral-Derivative (PID) controllers are used to provide a method of process control while satisfying a set of constraints. However, optimization of these controllers when used in a multivariable environment presents complexities in determining the optimal overall profit for the process while managing the variables of each load within the process.

Accordingly, systems and methods integrated quadratic control of multivariable industrial process control remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
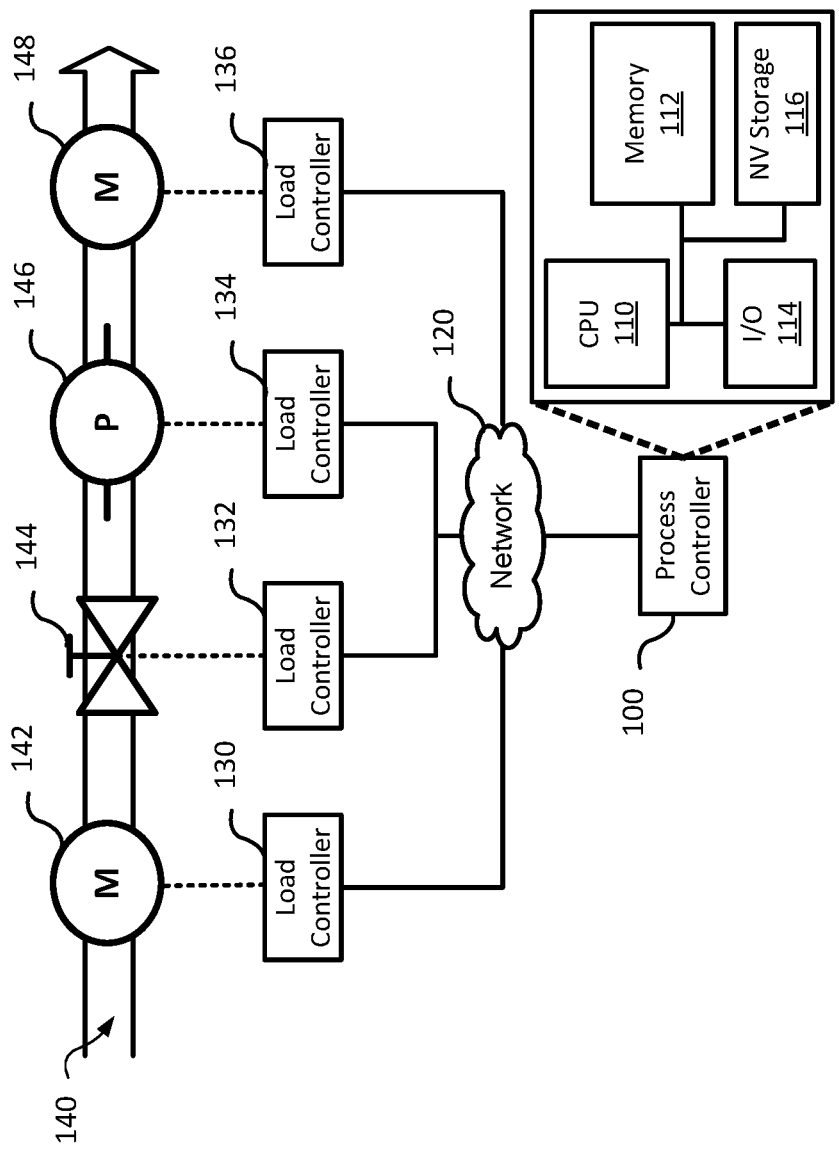
FIG. 1 shows a representation of industrial process utilizing an integrated quadratic control system.

Embodiments are described below, by way of example only, with reference to FIGS. 1-4.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of operating an industrial process by an integrated quadratic controller (IQC). The method also includes determining a target process value (PV) associated with an output of the industrial process defining a single-input of a multiple-outputs (SIMO) process; determining manipulated-variables (MVS) associated with a plurality of loads within the industrial process, where each of the MVS is associated with one of the plurality of loads controlling a rate of operation associated with the load impacting the PV of the industrial process; determining quadratic programming (QP) optimized proportional action gains for the determined MVS given an updated control variable PV; integrating QP gain-modified proportional action into a control system of the industrial process; and applying modified control system to update my output state map defining multiple outputs to control respective loads in the industrial control process for achieving the target PV. Other embodiments of this aspect include corresponding computer systems, apparatus, and computer programs recorded on one or more computer storage devices, each configured to perform the actions of the methods.

Implementations may include one or more of the following features. The method where applying the modified control system to update my output state map further may include: sending the determined my control values to the respective load controllers, and determining the my result on PV of the industrial process from the application of the my control values. The method may include for each of the MVS, determining a maximum value and a minimum value range associated with the respective MV. The method may include sending the determined MV control values to respective load controllers. The method may include for each respective my of the MVS if the respective my has reached a maximum value and removing the respective my from the QP optimized proportional action. The method may include: modifying MV values within the range of the determined maximum value and minimum value range, and determining QP allocation of proportional gain weights for MVS. The load is associated with an industrial component having an associated control interface. The industrial component is one of a motor, a generator, a valve, a pump, an actuator, or a conveyor. Implementations of the described techniques may include hardware, a method or process, or computer software on a computer-accessible medium.

One general aspect includes a system of operating an industrial process. The system of operating also includes a plurality of loads forming part of the industrial process, each load having an associated process controller for manipulating a respective manipulated-variable (MV) associated with the load controller for controlling a rate of operation of the respective load; and an process controller coupled to the controllers of the plurality of loads through a network, the process controller may include: a processor; and a memory coupled to the processor, the memory containing instructions to determining a target process value (PV) associated with an output of the industrial process defined by a single-input multiple-output (SIMO) system, determining quadratic programming (QP) optimized proportional action gains for the determined MVS given an update control variable PV, the QP gain-modified proportional action is integrated into a control system executed by the IQC, which is applied to modified control system to update MV output state map defining the multiple outputs to control respective load controllers in the industrial control process for achieving the single input defined by the target PV. Other embodiments of this aspect include corresponding computer systems, apparatus, and computer programs recorded on one or more computer storage devices, each configured to perform the actions of the methods.

Implementations may include one or more of the following features. The system where the my control values from the MV output state map is sent to the respective load controllers for application by the respective load. For each of the MVS, a maximum value and a minimum value range associated with the respective my are defined for the respective load controllers. The process controller, for each respective my of the MVS if the respective my has reached a maximum value and removing the respective my from the QP optimized proportional action. The my values are modified within the range of the determined maximum value and minimum value range and are QP allocated by proportional gain weights for MVS. The load is associated with an industrial component having an associated control interface for interfacing with the respective load controller. The industrial component is one of a motor, a generator, a valve, a pump, an actuator, or a conveyor. The process controller is incorporated in a proportional-integral-derivative (PID) controller. Each of the load controllers are an industrial control system (ICS). Implementations of the described techniques may include hardware, a method or process, or computer software on a computer-accessible medium.

The disclosed integrated quadratic controller (IQC) provides an elegant way to negotiate maximum feed-rate across multiple manipulated variables (MVs). With a single manipulated variable the IQC (i.e. at the limit) when applied to proportional-integral-derivative (PID) controller behaves exactly the same as the traditional PID. For multiple MVs a quadratic programming (QP)-optimized control is applied with respect to proportional action that ends up maximizing profit according to the QP form at the execution (scan-to-scan) level. QP is the process of solving mathematical optimization problems involving quadratic functions by seeking to optimize (minimize or maximize) a multivariate quadratic function subject to linear constraints on the variable. Final convergence (linear programming (LP) vertex or QP optimal, etc.), depends if velocity form is used (is like derivative with respect to x of QP=LP) or not and whether profits are dynamically modified. The function described can be integrated in existing control methods and can provide multivariable control of a single constraint with multiple outputs, mid-ranging control and single variable traditional controllers control for enhanced saturation recovery.

A single constraint variable may be controlled using multiple outputs. Each load can be tuned like a traditional controller, such as a PID controller, and the profit designation along with the maximum constraint dictates how each load optimizes their output to maximize total profit. For mid-ranging control, duty is allocated by the IQC according to the relative differences between the profits and the optimizer will not attempt to optimize profit on its own.

In industrial processes multiple steps of the process 140 can have multiple stages each having a respective load as shown in FIG. 1. Each operation stage of the process 140 is controlled by a respective controller 130, 132, 134, 136 controlling respective loads such as for example motor 142, valve 144, pump 146 and motor 148. The load at each of the stages need to be controlled for efficient operation of the overall process. The output of the process 140 can be defined as a the profit of the process. The profit may be adjust based upon the variables of each step. The load controllers 130, 132, 134 and 136 can be controlled, via a network 120, by an integrated quadratic controller (IQC) 100. Various control algorithms in industrial control systems (ICS) may be utilized by each controller based upon the type of load and the respective parameters, such for example a programmable logic controllers (PLCs), distributed control systems (DCS) and supervisory control and data acquisition (SCADA) controller.

The IQC 100 comprises one or more processors 110, coupled to a memory 112 which contain instructions that are executed by the processor 110 to control the process. A non-volatile storage 116 can contain the instructions, processing data, control parameters and codes for executing functions of the IQC 100. An input/output interface 114 couples the memory to the network 120 and other computer interfaces to enable access and control of the IQC 100. The IQC 100 integrates a quadratically optimized proportional feedback response into the controller that may include other control elements such as integral action, derivative action, and feed-forward to name a few.

In the IQC 100, the optimized proportional feedback response acts proportionally to the change in the process value (PV) or the controller error (set-point minus PV) is shaped by a quadratic program. While the IQC 100 may be applied to single input (single control variable)—single output (single manipulated variable) processes, IQC 100 is an exceptional multivariable controller for single-input multiple-output (SIMO) systems. As a SIMO controller, the integrated quadratic proportional feedback response optimizes the entire set of manipulated variable outputs such that an optimal, maximum profit, system state is achieved. IQC 100 can be implemented as a velocity-form controller (a controller that acts on the change of the controller PV or error between controller executions) that quadratically allocates the incremental (velocity) proportional feedback response to the current state of the constrained set of outputs. Internally, as a velocity form controller the objective function flips between solving a quadratic program that maximizes profits and one that minimizes costs depending if the change in PV tends away from a constraint limits or towards it, respectively.

IQC 100, as a velocity form controller, effectively converges to the vertex of a linear optimal solution that first maximizes the most profitable control outputs subject to their constraints and may converge to a quadratic or higher order optimal solution when the profits are dynamically set. A velocity form controller is more desirable than a position form controller (a controller that acts directly on the PV or error) as it provides more flexibility as the profits may be dynamically set without sudden transitions to the manipulated outputs and the outputs can start off at any state and converge to an optimal solution at a tunable response speed.

The IQC 100 can adopt other control elements such as integral feedback and derivative feedback for example. In application, IQC 100 is capable of optimizing SIMO problems using the relative profit values of each control output and can be readily deployed as an advanced multivariable controller with minimal complexity as relative profit is the only additional tuning parameter on top of proportional gain. In comparison, IQC 100 is superior to model predictive control (MPC) for SIMO problems where the disturbances are poorly measured (if at all) owing to the superior feedback mechanism afforded by the quadratically optimized proportional feedback response, and IQC 100 is superior to using multiple proportional-integral-derivative (PID) controllers in parallel that control to the same PV and are only pseudo-optimized using different set-points applied to the integral feedback of the controllers or are pseudo-optimized using exceptionally complex nonlinear tuning between each controller to act as communication bridges.

Figure 2:
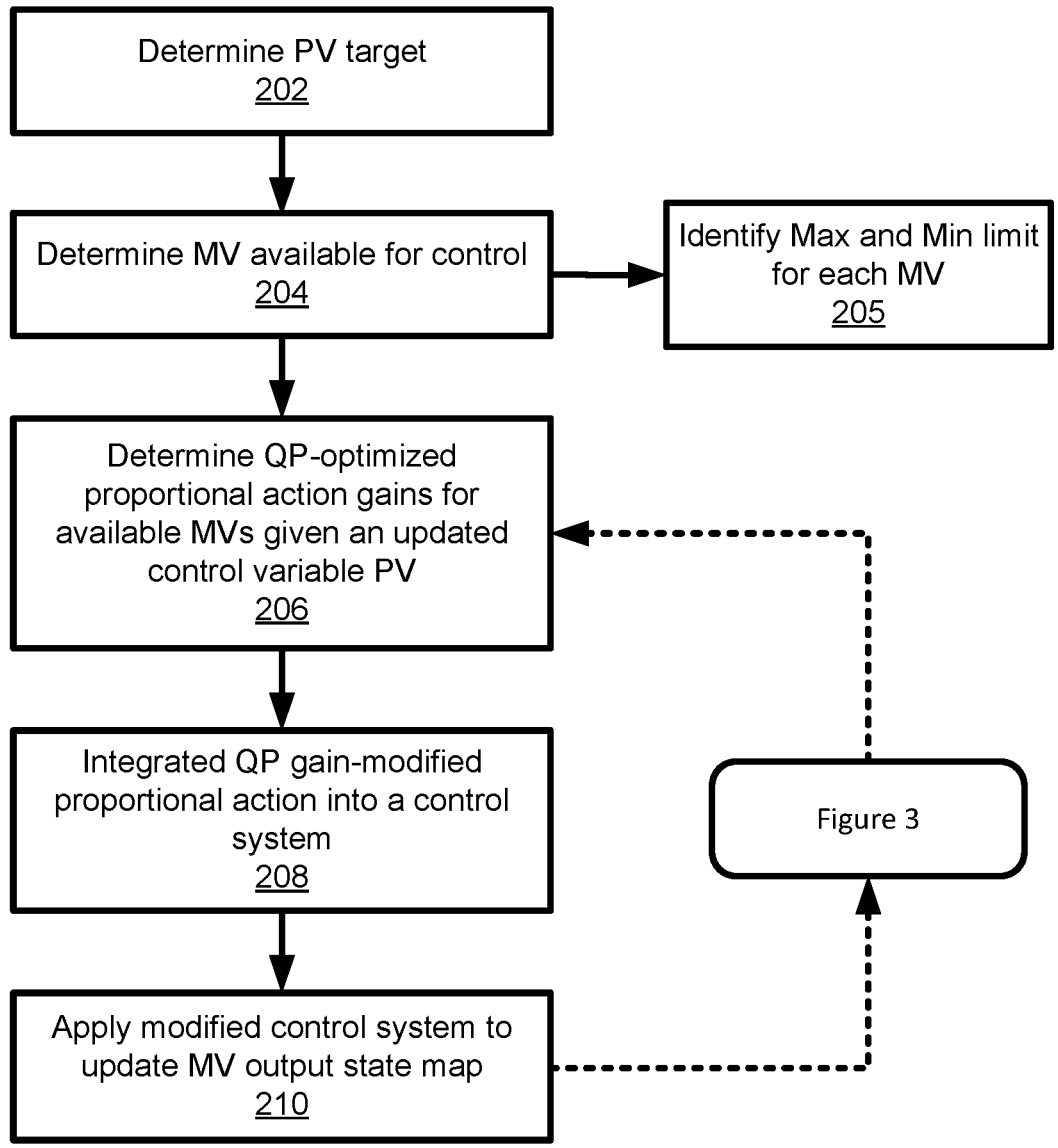
FIG. 2 shows a method of instigated quadratic control.

FIG. 2 shows a method 200 of instigated quadratic control. The process variable (PV) target is determined (202). The manipulated variables (MVs) available for control (204) for respective loads, and controllers, are determined. The MVs are dependent on the type of load, for example the speed, torque, feed rate, pressure, power, etc. For each of the MV values a maximum and minimum is also be determined (205) for optimizing the profit of the respect load. The values may be based upon pre-defined parameters associated with the respective load equipment or provided as operator input.

The QP gain-modified proportional action is integrated into chosen control algorithm (208). QP-optimized proportional action gains available for given MV's given an updated control variable PV are determined (206).

The QP form applied to P action is min(x): xAx

Subject to: $x<H$ and $x>L$ where x is the manipulated variable output vector. A is the cost vector (inverted costs i.e. profits). H is the high limit vector. L is the low limit vector.

Also written as:

$$\min(x): a_1^* x_1^2 + a_2^* x_2^2 + \ldots + a_n^* x_n^2$$

$$\text{subject to:} x_1 < H_1; x_2 < H_2; \ldots ; x_n < H_n;$$

$$x_1 > L_1; x_2 > L_2; \ldots ; x_n > L_n;$$

$$x_1 = \text{load}(1) \ldots x_n = \text{load}(n)$$

Each load parameter is normalized. The modified control algorithm is then applied to MV output state map (210) to control the functions of the respective loads.

Figure 3:
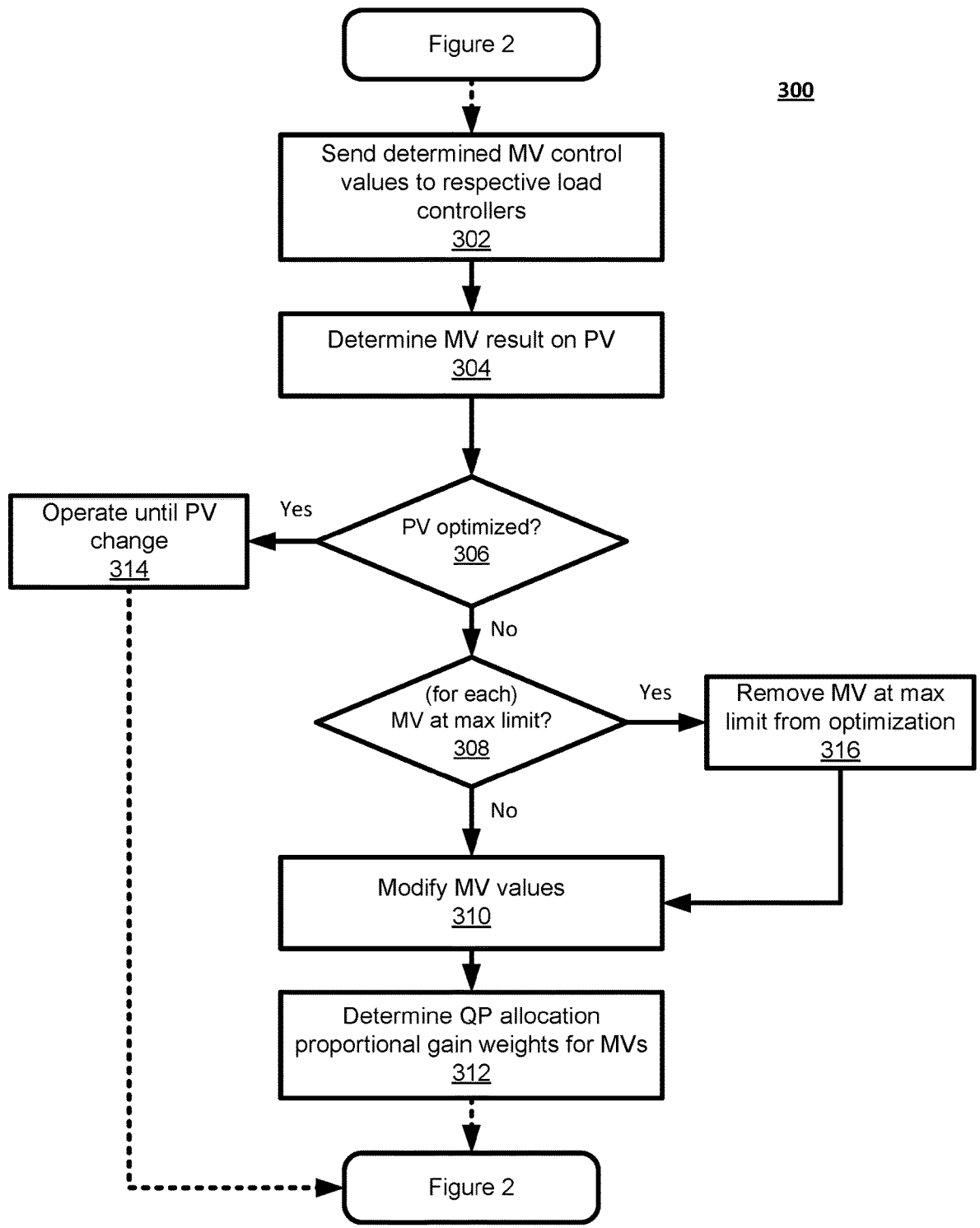
FIG. 3 shows a method determining QP-optimized proportional action gains.

FIG. 3 shows a method 300 for determining QP-optimized proportional action gains. The determined MV control variables are sent to the respective load controllers (302) based upon the updated MV output state map. The MV result on the PV is then determined (304). If the PV is optimized (YES at 306), that is the determined PV is at the target PV or within a defined margin, the process continues operation until there is a change in the PV value (314) to a non-optimal value. If the PV is not at the optimal value (NO at 306), for each MV, it is determined if the particular MV is at the maximum value threshold. For example if a motor is working at maximum torque or a valve is at a fully open setting. When the PV moves towards the constraint limit, the most profitable loads have diminished control action. If the MV is at the maximum threshold (YES at 308) it therefore can not be changed further and is removed from the optimization (316) in evaluating the QP. The MV values can then be modified (310) within the maximum and minimum limits and in respect to the particular algorithm being utilized and at a defined rate of allowable change. The optimal proportional action multiplier is calculated to apply to each MV to achieve a maximum optimal output with a normalized weighted average providing a combined value of 1. The quadratic programming (QP) allocation of proportional gain weights for the remaining MVs (312) are allocated to optimized the PV.

Figure 4:
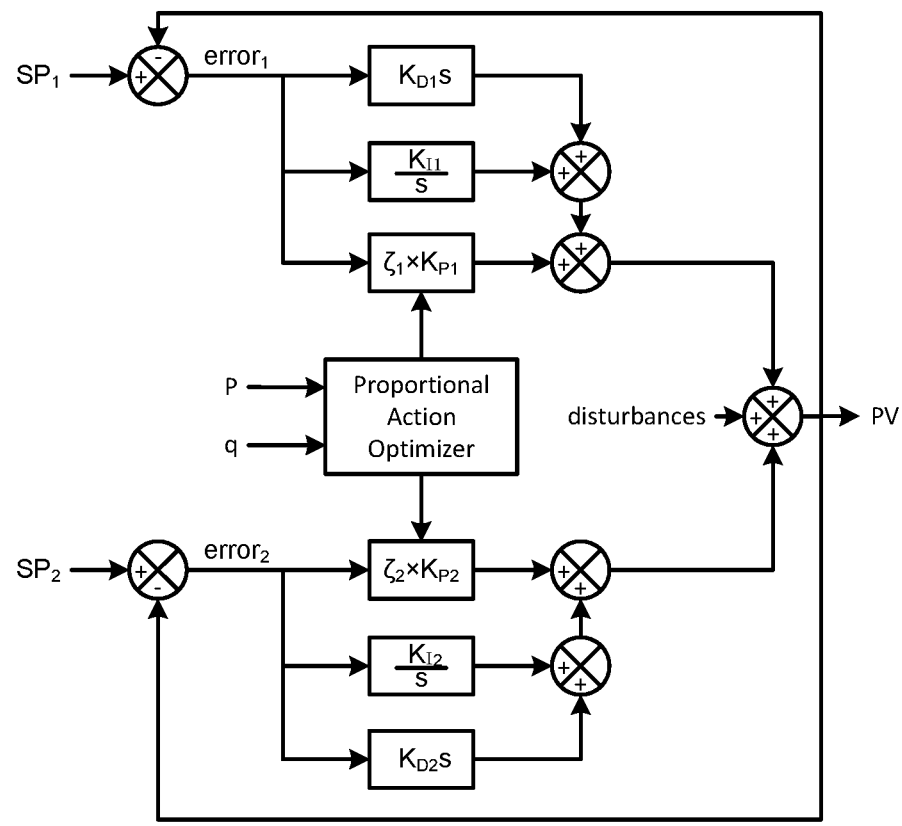
FIG. 4 shows an integrated in closed loop block diagram.

With reference to FIG. 4, an integrated in closed loop is demonstrated with two MVs of a of a single-input multiple-output (SIMO) system. The following terms are used with reference to FIG. 4 and the example below:
SP Set-point;
PV Process Value;
$\zeta$ Proportional action modifier;
$K_P$ Proportional action gain;
$K_I$ Integral action gain;
$K_D$ Derivative action gain;
P quadratic cost matrix;
q linear cost vector;
s Laplace variable.

The QP optimization form applied:

minimize: $\frac{1}{2} x^T P x + q^T x + r$ subject to: $f^T x \leqslant h$ $g^T x \geqslant l$ $a^T x = b$ where bold upper-case denotes a matrix, and bold lower case denotes a vector. Here, P is the quadratic cost matrix and is typically symmetric and positive definite in IQC; q is the linear cost vector; h is the high constraint limit vector; l is the low constraint limit vector; a is the equality constraint weight vector; f, g are the inequality constraint vectors; b is the equality constraint scalar; r is a scalar constant. The quadratic program can be solved numerically using Newton's Method and the method illustrated in FIG. 3. The solutions to x constitute the QP-optimized proportional action weights, depicted with $\zeta$.

EXAMPLE: INTEGRATION OF QUADRATICALLY OPTIMIZED PROPORTIONAL ACTION INTO A STANDARD PID FORM FOR TWO MANIPULATED VARIABLES

The standard form for a PID controller is:

$$\text{OUT}(s) = \left[ K_P + \frac{K_I}{s} + \frac{K_D s}{K_D s + 1} \right] e(s) + F(s)$$

and the IQC form having QP-optimized proportional action gain is:

$$\text{OUT}(s) = \left[ \zeta K_P + \frac{K_I}{s} + \frac{K_D s}{K_D s + 1} \right] e(s) + F(s)$$

where $\zeta$ is the QP optimized proportional action modifier; $K_P$ is the proportional action gain; $K_I$ is the integral action gain; $K_D$ is the derivative action gain; s is the Laplace variable; e is the control error (SP–PV); F is the feed-forward contribution.

In this example, we apply QP optimization to the standard velocity form PID. The QP optimization form, chosen for this demonstration example is:

minimize: $\zeta^T P \zeta + q^T \zeta$ subject to: $1^T \zeta \leqslant 0$ $1^T \zeta = 1$ and we'll set $$P = \begin{bmatrix} 2 & 0.5 \\ 0.5 & 1 \end{bmatrix}$$

as a symmetric profit matrix, and $$q = \begin{bmatrix} 0.5 \\ 1.0 \end{bmatrix}.$$

Expressed explicitly this is:

minimize: $2\zeta_1^2+\zeta_2^2+\zeta_1\zeta_2+0.5\zeta_1+\zeta_2$ subject to: $\zeta_1 \geq 0, \zeta_2 \geq 0$ $\zeta_1+\zeta_2=1$ We solve with Newton's Method and find $$\zeta = \begin{bmatrix} 0.375 \\ 0.625 \end{bmatrix}.$$

In other words, the QP-optimized proportional action for this example is:

$OUT_1(s)=[0.375K_{P1}]e_1(s)$ $OUT_2(s)=[0.625K_{P2}]e_2(s)$

As would be understood a person of skill in the art, the example described above can be extended to a multiple output system defining multiple loads.

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-4 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. A method of operating an industrial process by an integrated quadratic controller (IQC) comprising a processor and a memory, the IQC communicatively coupled through a communication network to multiple load controllers, each one of the multiple load controllers is associated with a respective load, each of the respective loads associated with operation of a portion of the industrial process, the memory containing instructions for performing the method comprising:
   determining, by the IQC, a desired target output process value (PV) for a total output PV for the industrial process defined as an input in a single-input multiple-outputs (SIMO) process;
   determining, by the IQC, a plurality of manipulated-variables (MV)s, for the multiple-outputs, for each MV of the plurality of MVs associated with operation of each of a respective load controller of the multiple load controllers within the industrial process, wherein the respective MV of the plurality of MVs are associated with each one of the multiple loads and control a rate of operation for a respective load impacting the total output PV of the industrial process, wherein each one of the multiple loads has an associated load controller operating based upon the respective MV;
   determining, by the IQC, quadratic programming (QP) for optimizing proportional action gains for associated quadratic coefficients for the determined plurality of MVs, given the target output PV, to maximize profitability of the total output PV of the industrial process;
   integrating, by the IQC, the QP optimized proportional action gains for the determined plurality of MVs of the multiple load controllers, wherein each of the multiple load controllers using proportional action feedback to control the respective output; and
   applying, by the IQC, an updated output state map defining modified MVs of the plurality of MVs from the integrated QP optimized proportional action gains by communicating the modified MVs from the output state map via the communication network to each of the multiple load controllers to control the rate of operation and respective loads associated with each of the load controllers in the industrial process to obtain the total output PV from the multiple load controllers within a margin of the target output PV.

2. The method of claim 1 further comprising for each respective manipulated-variable (MV) of the MVs if the respective MV has reached a maximum value, removing the respective MV from the QP optimized proportional action.

3. The method of claim 1 wherein applying the updated output state map further comprises:
   sending the multiple outputs to the respective load controllers;
   determining the total output PV of the industrial process from application of the multiple outputs; and
   comparing the output PV to the target PV.

4. The method of claim 3 further comprising for each of the MV, determining a maximum value and a minimum value range associated with the respective MV.

5. The method of claim 4 further comprising:
   modifying MV values within the range of the determined maximum value and minimum value range; and
   determining QP allocation of proportional gain weights for each MV of the MVs.

6. The method of claim 1 wherein each of the multiple load controllers has an associated industrial component having an associated control interface to communicate with the IQC.

7. The method of claim 6 wherein the industrial component is one of a motor, a generator, a valve, a pump, an actuator, or a conveyor.

8. The method of claim 1 wherein the QP form is applied is min(x):

$xAx$ subject to: $x<H; x>L$ where x is a manipulated variable output vector;
A is a cost vector;
H is a high limit vector;
L is a low limit vector;
and $\min(x): a_1{}^*x_1{}^2+a_2{}^*x_2{}^2+\ldots+a_n{}^*x_n{}^2$ subject to: $x_1<H_1; x_2<H_2; \ldots; x_n<H_n;$ $x_1>L_1; x_2>L_2; \ldots; x_n>L_n;$ $a_1$=weighted profit(load(1)) ... $a_n$=profit(load(n))

$x_1$=load(1) ... $x_n$=load(n).

9. The method of claim 1 wherein the QP optimization form is applied by:

minimize: $\frac{1}{2}x^T P x + q^T x + r$ subject to: $f^T x \leq h$ $g^T x \geq l$ $a^T x = b$ where, P is a quadratic cost matrix and is typically symmetric and positive definite in IQC; q is a linear cost vector; h is a high constraint limit vector; l is a low constraint limit vector; a is an equality constraint weight vector; f, g are inequality constraint vectors; b is an equality constraint scalar; r is a scalar constant, the quadratic program can be solved numerically using Newton's Method, wherein solutions to x constitute QP-optimized proportional action weights, depicted with $\zeta$; and a standard form for a PID controller is:

$$\text{OUT}(s) = \left[ K_P + \frac{K_I}{s} + \frac{K_D s}{K_D s + 1} \right] e(s) + F(s)$$

and the IQC form having QP-optimized proportional action gain is:

$$\text{OUT}(s) = \left[ \zeta K_P + \frac{K_I}{s} + \frac{K_D s}{K_D s + 1} \right] e(s) + F(s)$$

where $\zeta$ is a QP optimized proportional action modifier; $K_P$ is the proportional action gain; $K_I$ is an integral action gain; $K_D$ is a derivative action gain; s is a Laplace variable; e is a control error (SP–PV); F is a feed-forward contribution, where minimize: $\zeta^T P \zeta + q^T \zeta$ subject to: $1^T \zeta \geq 0$ $1^T \zeta = 1$.

10. A system of operating an industrial process, the system comprising:
multiple loads each associated with operation of a portion of the industrial process, each load of the multiple loads having an associated load controller operating based upon respective manipulated-variable (MV) associated with the load controller to achieve an associated output value in communication with an integrated quadratic controller (IQC);
the IQC coupled to each of the load controllers of the multiple loads through a communication network, the IQC comprising:
a processor; and
a memory coupled to the processor, the memory containing instructions to:
determine a desired target output process value (PV) for a total output PV for the industrial process defined as a single-input in a single-input multiple-outputs (SIMO) system;
determine a plurality of MVs, for the multiple-outputs, for each MV of the plurality of MVs associated with the operation of each of a respective load controller, wherein the respective MV of the plurality of MVs control a rate of operation for a respective load impacting the total output PV of the industrial process, wherein each one of the multiple loads has an associated load controller operating based upon the respective MV;
determine quadratic programming (QP) for optimizing proportional action gains for associated quadratic coefficients for the determined plurality of MVs, given the target output PV, to maximize profitability of the total output PV of the industrial process;
integrate the QP optimized proportional action gains for the determined plurality of MVs of the load controllers, wherein each of the load controllers using proportional action feedback to control the respective output; and
apply an updated MV output state map defining modified MVs of the plurality of MVs from the integrated QP optimized proportional action gains by communicating modified MVs from the output state map via the communication network to each of the load controllers controlling the rate of operation and respective loads in the industrial process to obtain the total output PV from the load controllers within a margin of the target output PV.

11. The system of claim 10 wherein the MVs are sent to the respective load controllers for application by the respective load to change the respective output.

12. The system of claim 11 wherein the memory further contains instructions to: for each of the MVs, define a maximum value and a minimum value range associated with the respective manipulated-variable (MV) for the respective load controllers.

13. The system of claim 12 wherein the memory further contains instructions to: for each respective MV of the MVs if the respective MV has reached a maximum value, removing the respective MV from the QP optimized proportional action.

14. The system of claim 13 wherein the memory further contains instructions to:
modify the MV values within a range of a determined maximum value and minimum value range, and
determine QP allocation of proportional weight gains for MVs.

15. The system of claim 11 wherein each of the multiple loads is associated with an industrial component having an associated control interface for interfacing with the respective load controller.

16. The system of claim 15 wherein the industrial component is one of a motor, a generator, a valve, a pump, an actuator, or a conveyor.

17. The system of claim 11 wherein the IQC is incorporated in a proportional-integral-derivative (PID) controller.

18. The system of claim 11 wherein each of the load controllers is an industrial control system (ICS).

19. The system of claim 18 wherein the ICS is implemented by supervisory control and data acquisition (SCADA) systems, distributed control system (DCS), or programmable logic controllers (PLCs).

\* \* \* \* \*